(12) United States Patent
Haas

(10) Patent No.: US 8,266,770 B2
(45) Date of Patent: Sep. 18, 2012

(54) CLIP FOR FABRICS

(75) Inventor: David J. Haas, Suffern, NY (US)

(73) Assignee: Tecco, Inc., Suffern, NY (US)

( * ) Notice: Subject to any disclaimer, the term of this patent is extended or adjusted under 35 U.S.C. 154(b) by 20 days.

(21) Appl. No.: 12/930,759

(22) Filed: Jan. 14, 2011

(65) Prior Publication Data

US 2012/0042479 A1 Feb. 23, 2012

Related U.S. Application Data

(63) Continuation-in-part of application No. 29/370,645, filed on Aug. 18, 2010, now Pat. No. Des. 631,737, and a continuation-in-part of application No. 29/370,646, filed on Aug. 18, 2010, now Pat. No. Des. 631,738.

(51) Int. Cl.
*A45F 5/04* (2006.01)
*B42F 1/12* (2006.01)
*A43C 3/00* (2006.01)
*F16B 2/20* (2006.01)
*B42F 1/10* (2006.01)

(52) U.S. Cl. ......... 24/7; 24/3.12; 24/3.4; 40/1.5; 40/641

(58) Field of Classification Search ............... 40/1.5, 40/641; 223/85, 87, 90, 91, 93, 96; 24/3.4, 24/7, 3.12, 545, 563, 67.9, DIG. 8, DIG. 9, 24/DIG. 10

See application file for complete search history.

(56) References Cited

U.S. PATENT DOCUMENTS

| | | | |
|---|---|---|---|
| 767,458 A * | 8/1904 | Weis | 24/67.9 |
| 1,193,265 A | 8/1916 | Honecker | |
| 1,291,432 A | 1/1919 | Davis | |
| 2,618,086 A | 11/1952 | Komourous | |
| 3,131,445 A * | 5/1964 | Lorber | 24/67.9 |
| 3,237,326 A | 3/1966 | Naffin | |
| 330,905 A | 3/1967 | Borisoff | |
| 334,827 A | 10/1967 | Gemani | |
| 3,673,641 A * | 7/1972 | Lorber | 24/67.9 |
| 386,100 A | 1/1975 | Wannag | |
| 4,011,639 A | 3/1977 | Koleske | |
| 4,011,673 A | 3/1977 | Levine | |
| 409,665 A | 6/1978 | Ullman, Jr. | |
| 4,871,097 A | 10/1989 | Blanchard et al. | |
| 4,943,026 A * | 7/1990 | Fildan | 24/561 |
| D314,015 S | 1/1991 | Hickman | |
| 5,008,982 A * | 4/1991 | Tsukamoto | 24/67.9 |
| 540,672 A | 4/1995 | Fan | |
| 5,504,976 A | 4/1996 | Reeves | |
| 564,074 A | 6/1997 | Haas | |
| D386,215 S | 11/1997 | White et al. | |
| 5,913,478 A | 6/1999 | Ochsman | |

(Continued)

*Primary Examiner* — Robert J Sandy
(74) *Attorney, Agent, or Firm* — Michael E. Zall

(57) ABSTRACT

A badge holder for attachment to a garment includes a planar clip body having an opening therein forming a periphery structure in the clip body. A planar flexible spring member appends from a top portion of the periphery structure, with the free end terminating within the opening near a bottom portion of the structure and is coplanar therewith. The gap between the edge surface of the spring member and the interior wall of the periphery structure decreases in width from the bottom portion of the peripheral structure to the top portion of the peripheral structure. A plurality of projecting elements project from the surrounding edge surfaces of the spring member and from the front surface to assist in firmly holding the fabric in the clip. A badge mounting member projects from the front surface of the periphery structure upon which a badge can be mounted.

13 Claims, 19 Drawing Sheets

U.S. PATENT DOCUMENTS

| | | |
|---|---|---|
| 608,697 A | 7/2000 | Haas et al. |
| 617,018 A | 1/2001 | Groner |
| 623,378 A1 | 5/2001 | Chov et al. |
| 6,594,865 B2 | 7/2003 | O'Mahonev |
| 6,826,811 B2 | 12/2004 | Adams |
| 696,610 A1 | 11/2005 | Gould |
| 697,370 A1 | 12/2005 | Hsiao |
| 717,460 A1 | 2/2007 | Ching |
| D552,978 S | 10/2007 | Liao |
| 2003/0014894 A1 | 1/2003 | Haas |
| 2004/0064920 A1* | 4/2004 | Arduini ......................... 24/67.9 |
| 2004/0133964 A1 | 7/2004 | Rudenko |
| 2006/0150457 A1 | 7/2006 | O'Boyle |
| 2008/0072403 A1 | 3/2008 | Peck et al. |
| 2009/0217558 A1 | 9/2009 | Maier-Hunke |

\* cited by examiner

CLIP FOR FABRICS

RELATED APPLICATIONS

This application is a Continuation-In-Part of U.S. Ser. No. 29/370,645 (3.1-006) and US Serial No. 29/370,646 (3.1-007) both filed on Aug. 18, 2010 and both entitled Clip For Identification Badges, now U.S. Pat. Nos. D631,737 and D631,738, respectively, both issued on Feb. 1, 2011.

BACKGROUND OF THE INVENTION

1. Field of the Invention

The invention relates to a unitary, one piece clip, preferably intended for attaching badges and other display items to garments, which safely and securely attaches the display item to a fabric, e.g., jacket pocket, or other flexible material.

2. Related Art

A badge clip is a clamping device to which a badge is attached and which is then clamped onto the users apparel. Typically such a clip is made of metal or plastic and employs jaws that open and close, and when closed, capture a narrow piece of the wearer's apparel. The jaw portion of the clip that actually grasps the fabric is usually a very narrow edge of the clip's jaw, i.e., thin teeth, that are only about 0.005"×0.40" in length. Typically, the actual teeth's area of a metal or plastic clip that grasps the clothing is only about 0.005 square inches.

Such badge clips usually employ springs and/or plastic levers that are stressed when the clip is used. For example, a metal spring clip tends to have a greater clamping force than, for example, a plastic clip and may be reused hundreds of times because the metal hinge or spring of the clip does not readily fatigue. However, such a metal clip is relatively expensive to manufacture. On the other hand, a plastic clip, which is less expensive to manufacture, usually includes levers and/or hinges made of plastic that are under severe stress when used and become progressively weaker with reuse due to the plastic flow of the molded plastic.

Other ways of attaching a badge to a person's clothing, are to provide a pressure-sensitive-adhesive badge that can be adhered to the user's clothing or to provide pins to enable the badge to be pinned onto the clothing. An adhesive backed badge is undesirable because it can only be used once and can damage certain type fabrics. Pinning a name badge to clothing, although used for many years, can puncture and tear delicate fabrics and presents difficulties in maintaining the badge, in the proper orientation. Additionally, the sharp point of the pin can stick and injure people, creating a health hazard. In hospitals and other environments, pin badges are not acceptable because a puncture of the skin can cause an infection or a contagious situation, e.g., HIV.

Lastly, a lanyard can be used to dangle a name badge from the user's neck. The badge is usually twirling, too high, or too low making it difficult to read as well as presenting anatomical difficulties for many females and/or an embarrassment for most men.

The applicant is aware of the following prior art clips and fastening means:
U.S. Pat. No. 7,174,608 to Ching
U.S. Pat. No. 6,973,700 to Hsiao
U.S. Pat. No. 6,966,103 to Gould
U.S. Pat. No. 6,826,811 to Adams
U.S. Pat. No. 6,594,865 to O'Mahony
U.S. Pat. No. 6,233,788 to Choy et al
U.S. Pat. No. 6,170,181 to Groner
U.S. Pat. No. 6,086,971 to Haas et al.
U.S. Pat. No. 5,640,742 to Haas
U.S. Pat. No. 5,504,976 to Reeves
U.S. Pat. No. 5,406,726 to Fan
U.S. Pat. No. 4,871,097 to Blanchard et al.
U.S. Pat. No. 4,096,655 to Ullman, Jr.
U.S. Pat. No. 4,011,639 to Koleske
U.S. Pat. No. 3,861,008 to Wannag
U.S. Pat. No. 3,348,272 to Germani
U.S. Pat. No. 3,309,052 to Borisoff
U.S. Pat. No. 3,237,326 to Naffin
U.S. Pat. No. 2,618,086 to Komorous
U.S. Pat. No. 1,291,432 to Davis
U.S. Pat. No. 1,193,265 to Honecker
US Publication No. 2003/0014894 to Haas
US Publication No. 2004/0133964 to Rudenko
US Publication No. 2006/0150457 to O'Boyle
US Publication No. 2008/0072403 to Peck et al.
US Publication No. 2009/0217558 to Maier-Hunke
U.S. Design Pat. No. Des. 552,978 to Liao
U.S. Design Pat. No. Des. 386,215 to White et al.
U.S. Design Pat. No. Des. 314,015 to Hickman.

None of these references teach or suggest the inventor's clip structure and combination of beneficial functions.

OBJECTS AND SUMMARY OF THE INVENTION

It is an object of the present invention to provide a unitary clip, preferably a one piece integrally molded clip made of plastic, useful for the attachment of identity badges to garments, employing lateral and perpendicular clamping forces to attach to the garment fabric.

It is yet another object of this invention to provide such a unitary clip which is adapted for injection molding in integral form.

It is yet another object of the present invention to provide several useful embodiments of a unitary, one piece clip for attachment to fabrics.

Another object of this invention is to provide a clip for fabrics which applies a clipping force laterally (parallel to) the layers of fabric to capture the fabric in the clip.

It is yet another object of this invention is to provide a plastic clip having a large area of a contoured tortuous frictional surface to prevent the fabric from moving or sliding, to distribute the clamping force of the clip and impede movement of the fabric.

All of the foregoing objects of this invention and others are achieved by the unitary one piece clip of this invention. The clip includes a substantially planar clip body having a front and rear surface and sides edges. An opening is provided in the clip body that passes through the front and rear surfaces to form a periphery structure, the periphery structure having an interior wall surrounding the opening.

The clip further includes a substantially planar flexible central spring member having front and rear surfaces and a surrounding edge surface. The spring member appends from a top portion of the periphery structure and has an opposing free end terminating within the opening near a bottom portion of the peripheral structure. The spring member and periphery structure are juxtaposed substantially within the same plane.

There is a gap between the surrounding edge surface of the spring member and the interior wall of the periphery structure that decreases in width from the bottom portion of the peripheral structure to the top portion of the peripheral structure.

When the spring member is flexed, preferably toward the rear surface of the clip body, out of the plane of the clip body, it creates a spring force. Subsequently, the fabric is placed over the front surface of the spring member and pushed toward the top of the periphery structure, the spring member is released and the spring force returns the spring member toward the plane of the clip body to grasp the fabric while the gap pinches the fabric to thereby firmly hold the fabric in the clip.

Several embodiments of a badge holder or badge are described herein as well as other embodiments for other uses.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
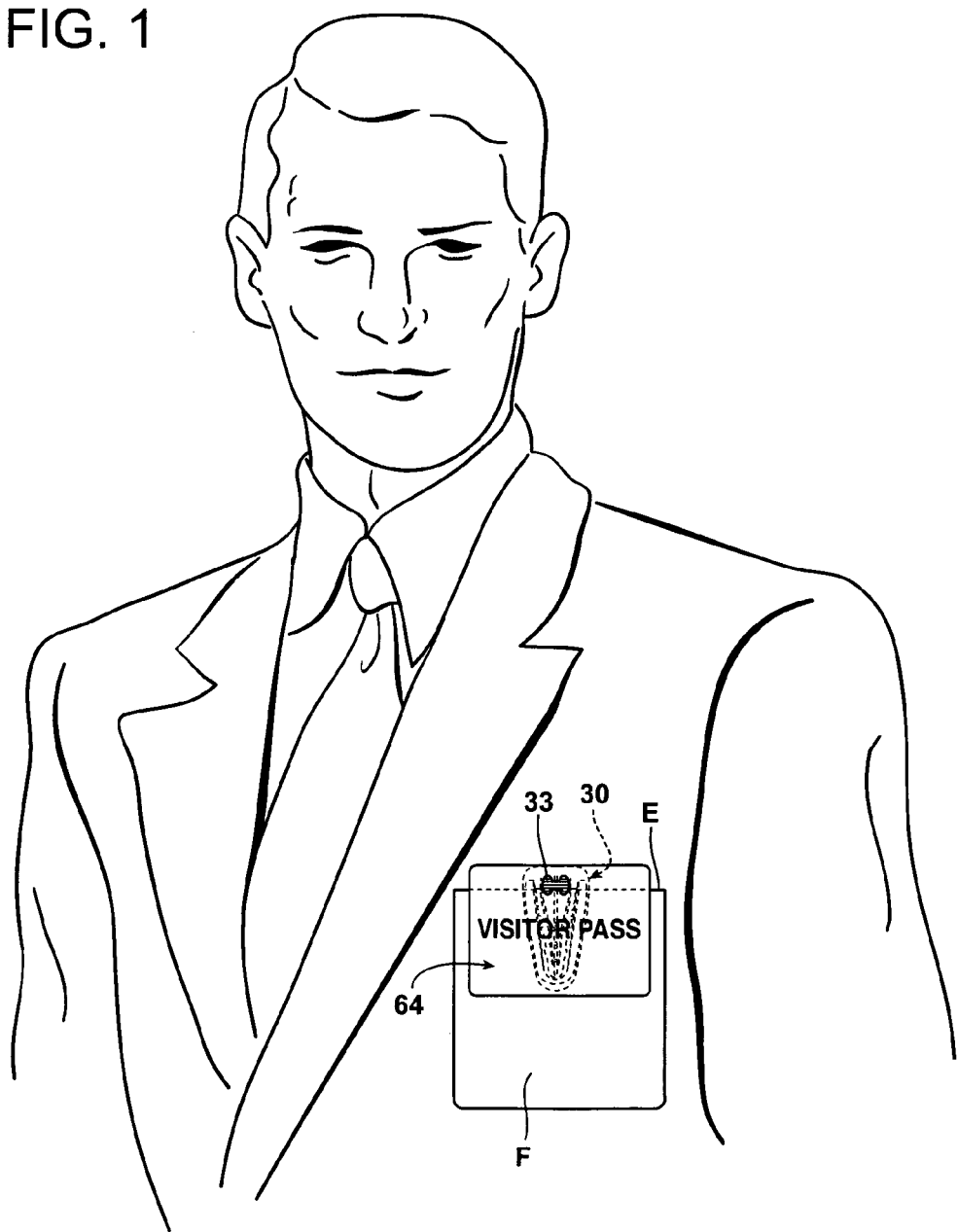
FIG. 1 is a perspective view of a first embodiment of the clip of this invention attached to the user's garment and having an identification badge thereon.
Figure 2:
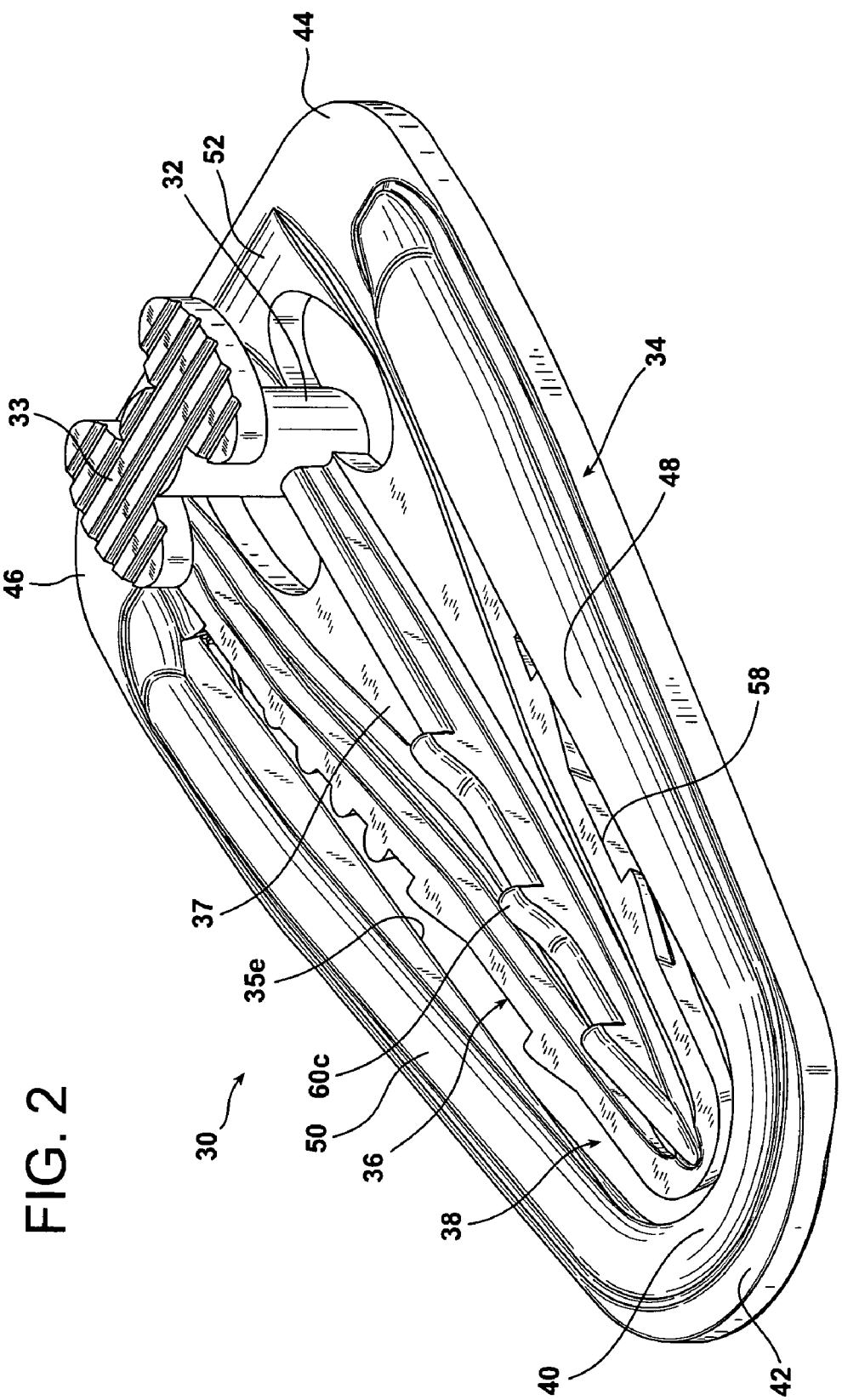
FIG. 2 is a front perspective view of the first embodiment of the clip of this invention.

FIGS. 1-19, show several embodiments of the clip of this invention. Preferably, all of the clips depicted herein are made of plastic and are integrally molded, unitary one piece clips. It should be understood however that other materials may be used, e.g., steel, provided the clip has the necessary elements and functions as described and/or claimed herein. For purposes of simplicity, we will assume herein that the clip is made of plastic herein.

FIGS. 1-9 depict the first embodiment of the clip in the form of a badge clip 30. The clip 30 is a unitary, one piece plastic-molded clip and includes a substantially planar clip body 34 that has a front 35*f* (FIG. 5) and rear 35*r* (FIG. 5) surface and side edges 35*e*. The clip body 34 has an opening 38 therein passing through the front 35*f* and rear surfaces 35*r* to form a periphery structure 40 having an interior wall 56 (FIG. 4) surrounding the opening 38. A badge post 32, preferably cylindrical, is mounted to the periphery structure 40 at one end of the clip body 34, designated herein as the top 52 of the clip 30.

Referring to FIGS. 1-9, a substantially planar flexible central spring member 36 is provided having front 37 and rear 39 surfaces and a surrounding edge surface 58. The spring member 36 appends from a top portion 52 of the periphery structure 40. The spring member 36 is springedly mounted to the periphery structure 40 near the badge post 32 and suspended within the opening 38. The spring member 36 has an opposing free end terminating within the opening 38 near a bottom portion or apex 42 of the peripheral structure 40 the spring member and periphery structure juxtaposed substantially within the same plane. The periphery structure 40 of the clip body 34 and central spring member 36 suspended within the opening 40, lie in substantially the same planar surface.

The preferred clip body 34 shape in all of the embodiments depicted is an isosceles triangle. However, it should be realized that any shape could be used, e.g., square, rectangular, circular, provided the other elements of the clip are appropriately modified. Referring for example to FIGS. 2, 4-6 and 8, the apex or bottom portion 42 of the clip body 34 has a rounded corner as do the other corners 44, 46. Emanating from the apex 42 are two legs 48, 50 of equal length and shape, i.e., thickness and width, that form the two sides of the clip body 34 and which are connected by cross structure 52. The opening 38 formed by the legs 48, 50 and top cross member 52 thus substantially conform to the triangular outer structure of clip body 34.

Still referring to FIGS. 2, 4-6 and 8, the central spring member 36 is connected to or appending from the cross member 52 and in its preferred embodiment conforms to the shape to the opening 38, lies within the opening and is substantially coplanar with the clip body 34. The spring member 36 is connected to the cross member 52 and is formed from materials and is of a shape that permits it to be flexed out of the plane of the clip body 34 and spring back into the plane of the clip body 34.

Figure 4:
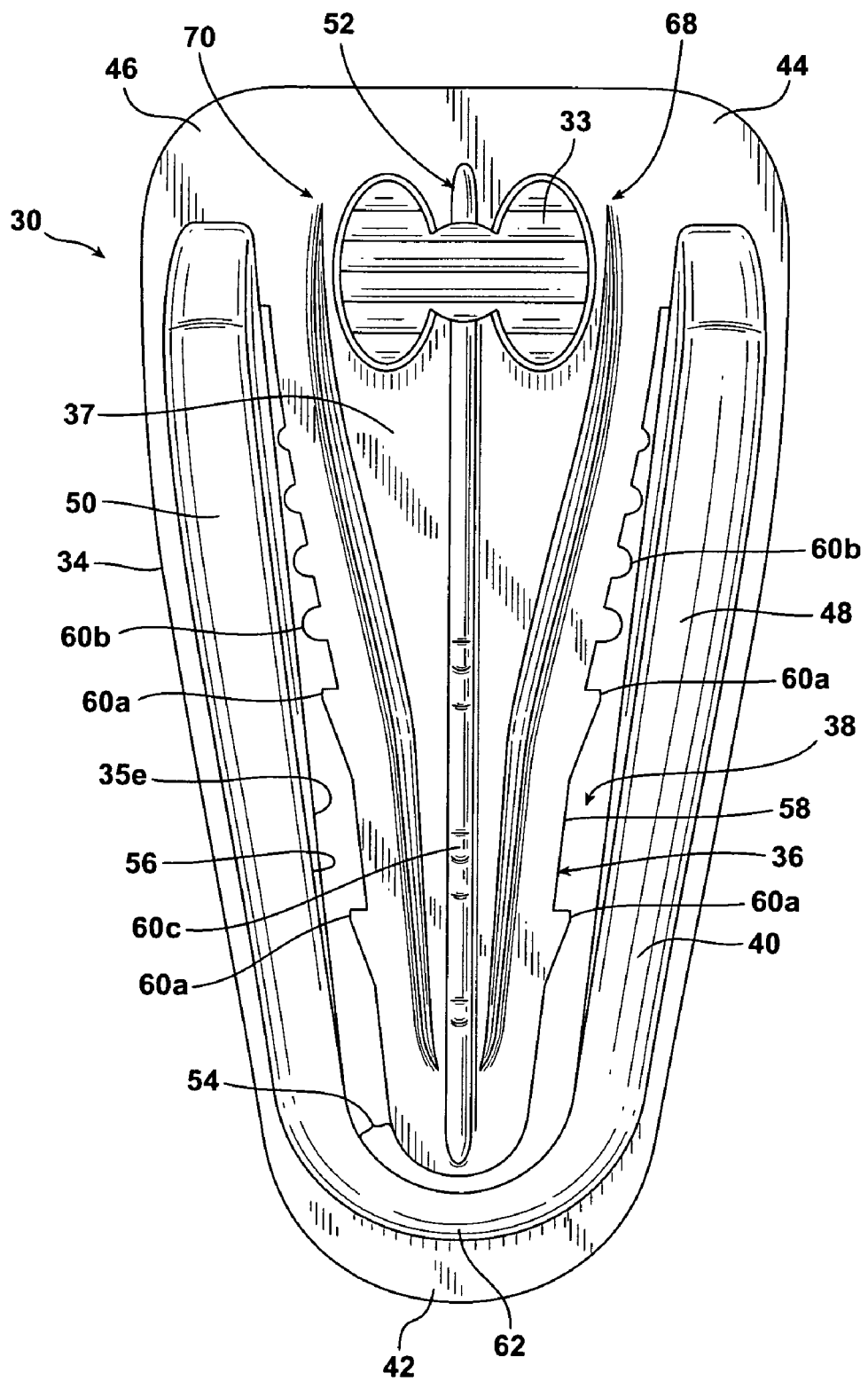
FIG. 4 is a front plan view of the first embodiment of the clip of this invention.

Referring for example to FIG. 4, the spring member 36 is of a shape that creates a variable width gap 54 between the interior wall 56 of the periphery structure 40 and the surrounding edge surface 58 of the central spring member 36. The variable width gap 54 is created by a combination of the taper of the central spring member 36 and its specific shape. The gap 54 between the surrounding edge surface 58 and the interior wall 56 decreases in width from the bottom portion 42 of the peripheral structure 40 to the top portion 52 of the peripheral structure 40. This variable width gap 54 permits the secure capture of fabrics F of different thickness and texture, see FIG. 9.

Figure 5:
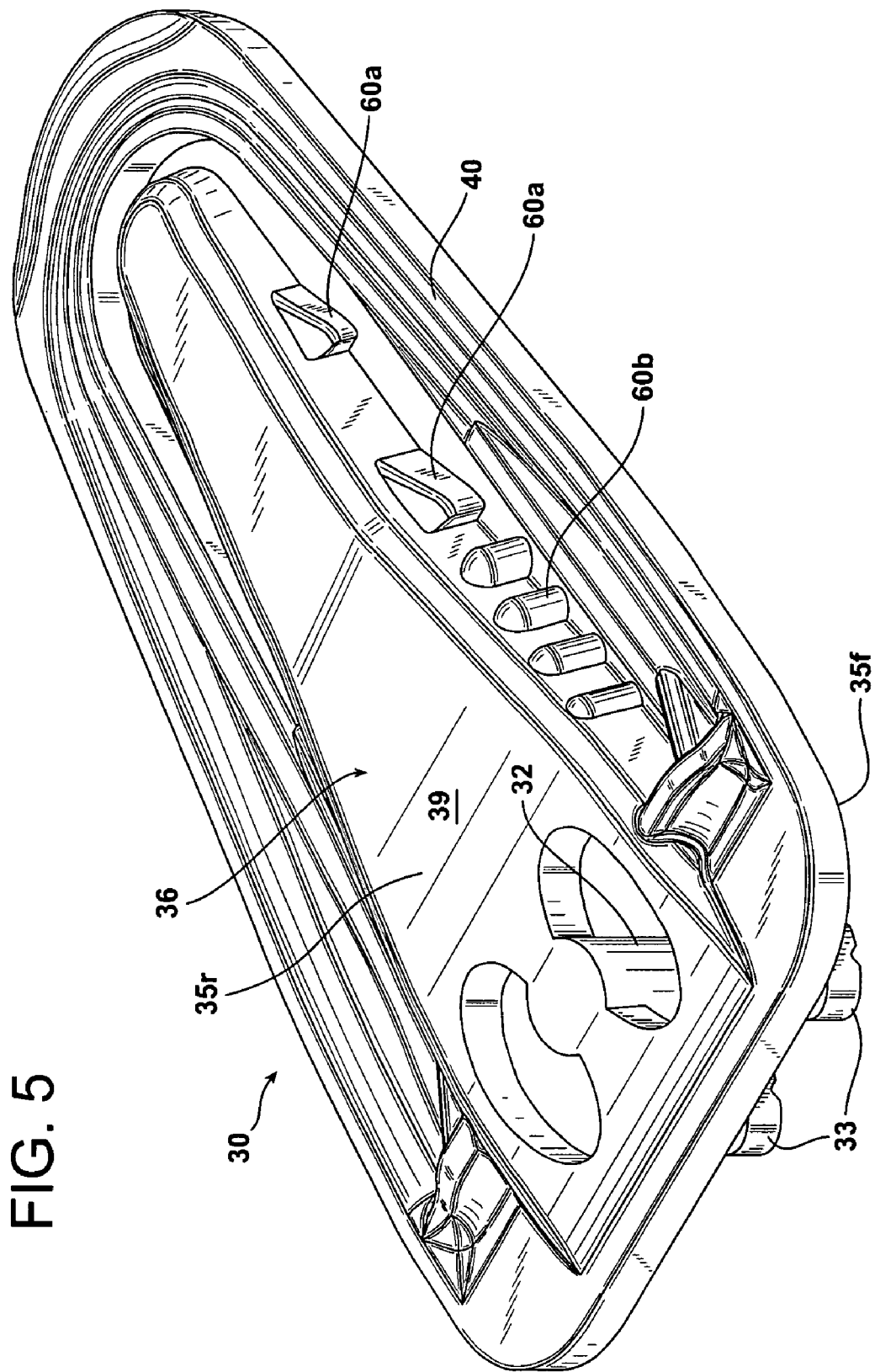
FIG. 5 is a rear perspective view of the first embodiment of the clip of this invention.
Figure 6:
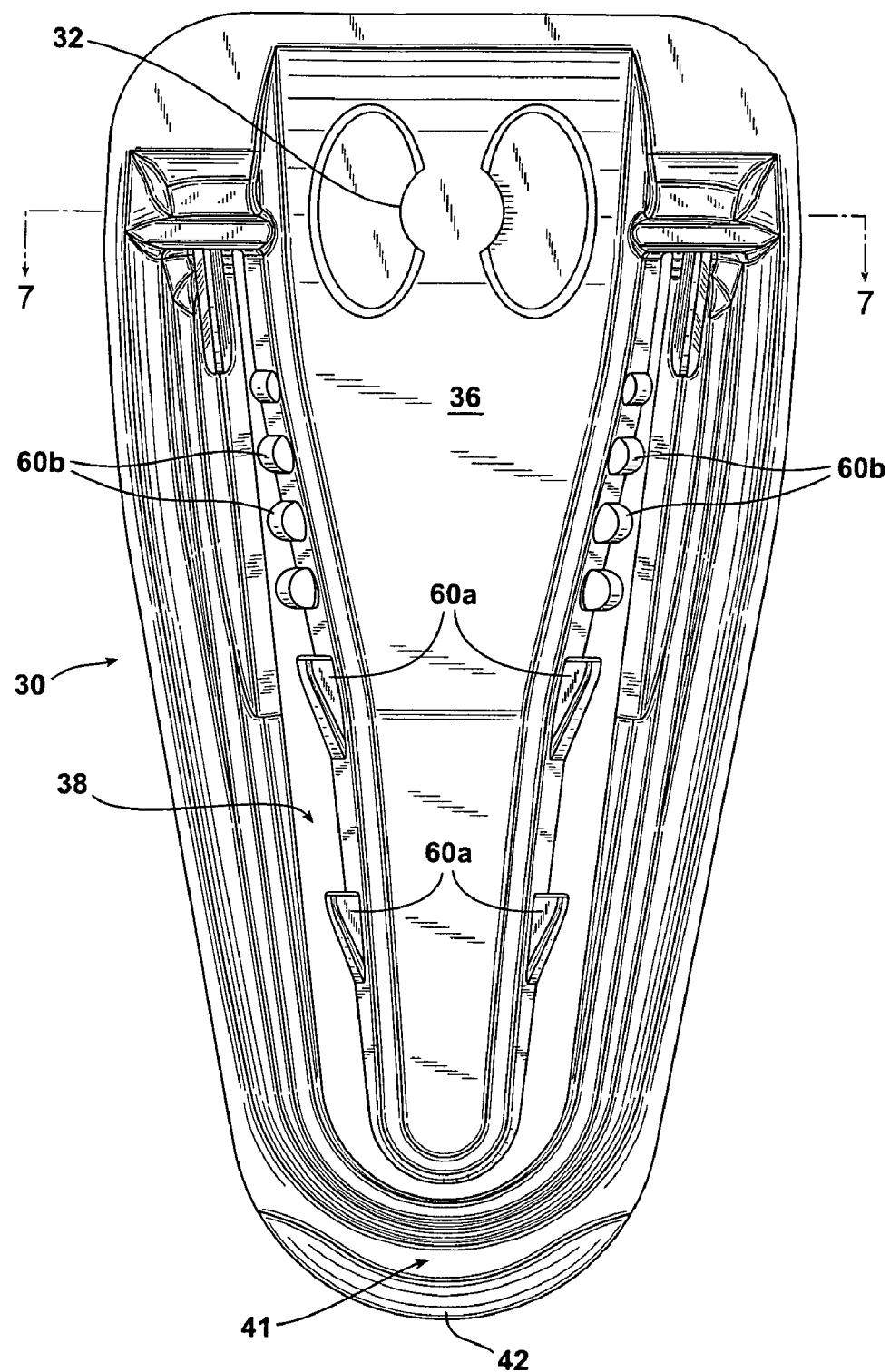
FIG. 6 is a rear plan view of the first embodiment of the clip of this invention.
Figure 7:
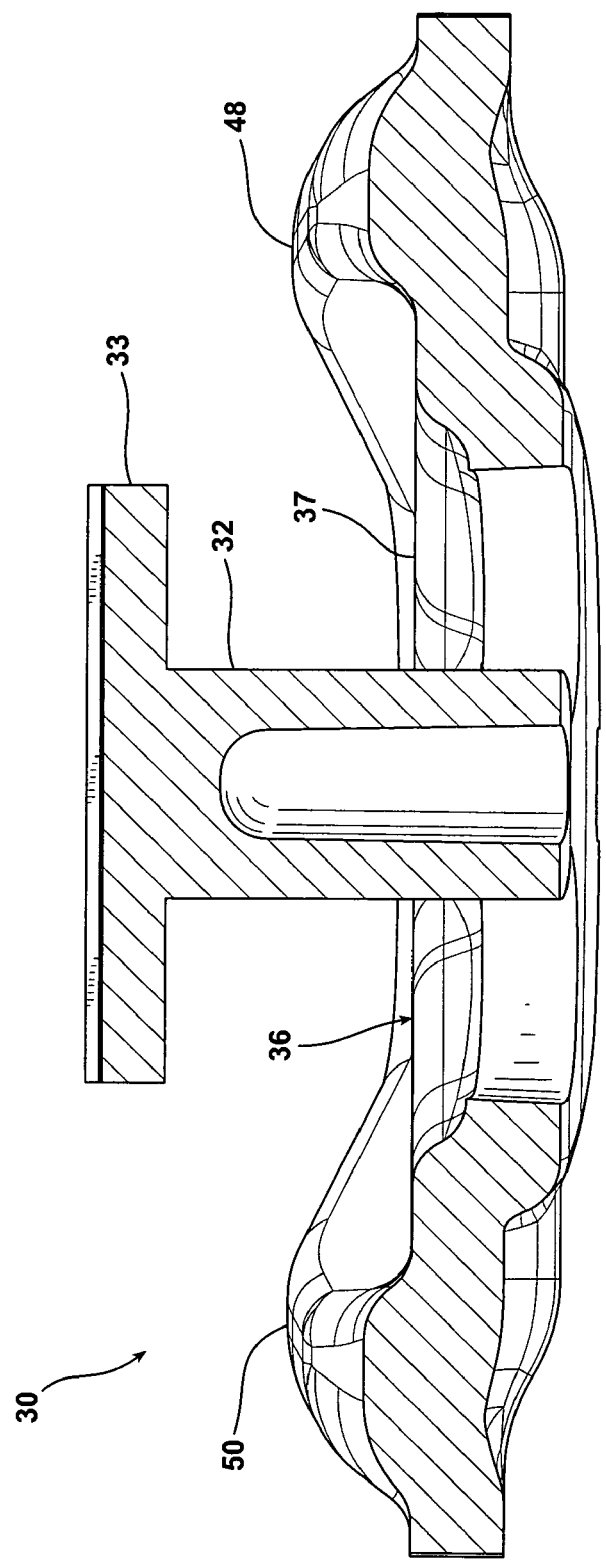
FIG. 7 is a cross-sectional view of the first embodiment of the clip of this invention taken along line 7-7 of FIG. 6.
Figure 9:
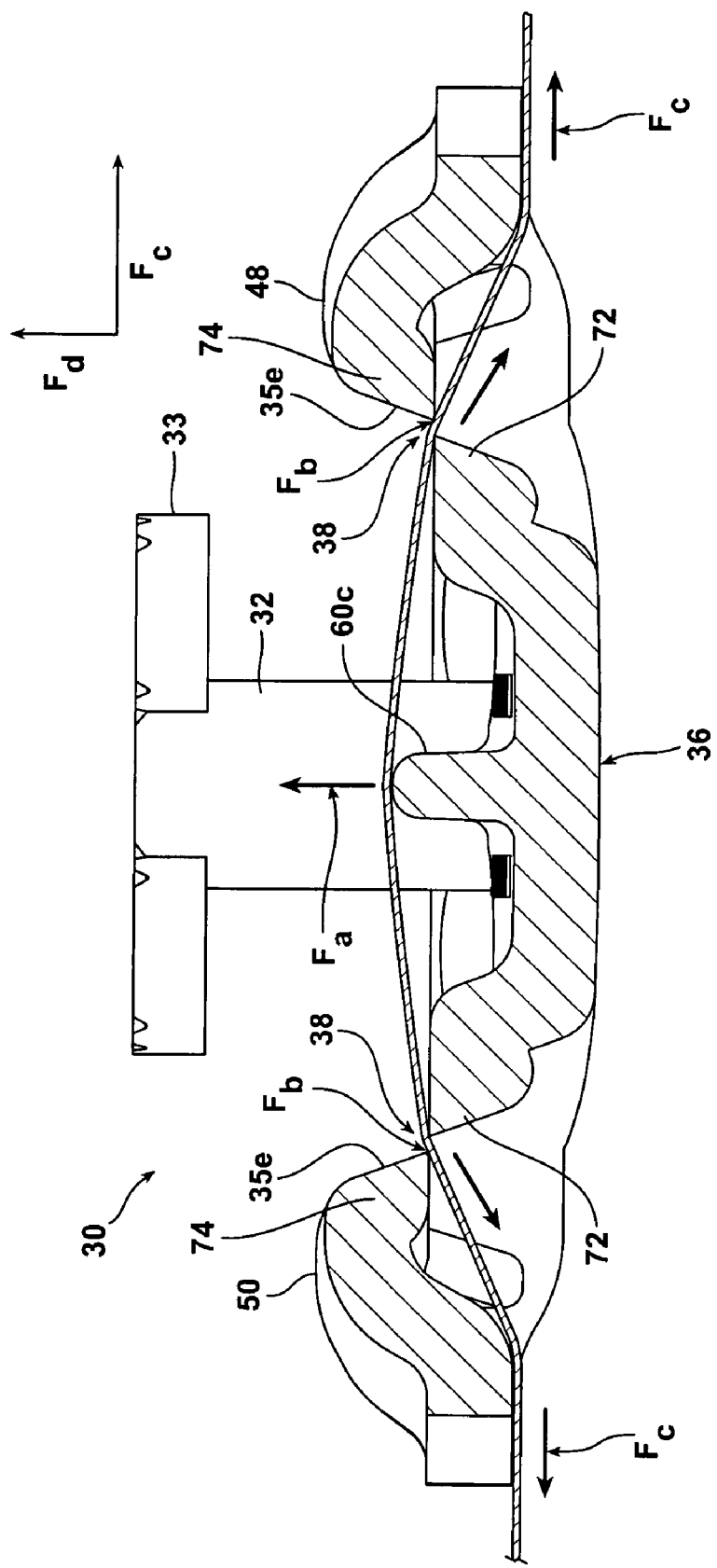
FIG. 9 is are partial cross-sectional schematic view of the first embodiment of the clip of this invention focusing on the clips interaction with the garment to which it is attached.

Referring for example to the first embodiment depicted in FIGS. 4-6, the central spring member 36 has a plurality of projecting elements, generally designated 60 projecting from the surrounding edge surfaces 58 of both sides of the spring member 36 to assist in firmly capturing, holding and/or pinching the fabric F. Preferably, a plurality of projecting elements 60*c* projects from the front surface 37 of the central spring member 36 to further assist in firmly holding the fabric F in the clip 30. Near the apex or bottom 42 of the clip body 34, the interior wall 56 of the clip body 34 is flared in order to provide a ledge 62 to assist the user in separating the clip body 34 from the central spring member 36 to permit the fabric F to be placed over the front surface 37 of central spring member 36 and grasped between the edge 58 of the spring member 36 and the interior wall 56 of the clip body 34. Referring to FIG. 9, the central spring member 36 and body 34 are both contoured to force the fabric F to wrap around the clip structure for a more secure attachment.

In use, the spring member 36 is flexed, preferably toward the rear surface 35r of the clip body 34, out of the plane of the clip body 34 creating a spring force. In this preferred manner, the fabric F is then placed over the front surface 37 of the spring member 36 and pushed toward the top 52 of the periphery structure 40. The stored spring force returns the spring member 36 toward the plane of the clip body 34 to grasp the fabric F and the gap 54 pinches the fabric F to thereby firmly hold it in the clip 30.

Referring to FIGS. 4-9, the combination of features that make the clip of this invention unique includes a variable gap width 54 running along the length of the spring clip member 36 from the bottom apex 42 to the top 52 of the clip that "captures" the fabric F. This "capture" is accomplished by the application of lateral forces Fc parallel to the fabric surface rather than the prior art capture by perpendicular forces. The variable gap 54 provides substantially more surface area for contact pressure between the clip and the fabric than conventional clamping type devices. Since the gap 54 width extends from a wide opening near the apex 42 to a very narrow opening near the top 52 of the clip, the clip 30 can accommodate different fabrics of varying thickness and apply sufficient grasping pressure independent of the type of material or thickness of the fabric. The additional projecting elements, e.g., scallops 60a, and bumps 60b along the edge 58 of the spring member 36 and scallops 60c along the front 37 central spine of the spring member 36 provide additional gripping power for the clip.

Depending on the thickness of the fabric F, the material will slide up the opened gap 54 between the central spring member 36 and the clip body 34 to a point where it will become firmly captured in the gap 54 of the clip 30 when the central spring member 36 is released. Projecting elements 60a, 60b, and 60c on the central spring member 36 can then effectively grasp the fabric F.

Referring to FIG. 9, the torque or spring force of the central spring member 36 (Fa) is generated by the twisting of the pivot arms 68, 70 (FIG. 4) from which the central spring member 36 appends. This torque or spring force compresses the fabric F at the narrowest position of the gap 54 near the top of the clip 30 between the two angled compression surfaces 72 and 74. These compression surfaces are symmetrical on both sides of the central spring member 36 and the clip body 34. Compression of the fabric F occurs progressively further down the gap 54 toward the apex 42, or bottom of the clip 30, as the space between the central spring member 34 and the clip body 34 widens. For thin fabrics F, the material will be captured and compressed near the top of the central spring member 36 while thicker fabrics F will become captured further down the clip body 34.

In the preferred clip 30, the gap 54 is about 0.005-0.010 mils at the top of the clip 30 and 0.050-0.100 mils at the bottom of the clip 30, spacing sufficiently wide to accommodate almost any type fabric F. This provides for maximum compression of the fabric F so that the clip 30 will not move or slide off the fabric F. The capture of the fabric F will depend, of course, on how wide the central spring member 36 is and the opening 38 in the clip body 34 to form the gap 54 and the force used by the user to push the clip 30 onto their garment F.

FIG. 9 schematically depicts the tortuous path of the fabric F around the central spring member 36 and the periphery structure 40 of the clip body 34. This tortuous path keeps the fabric F in contact with the frictional surfaces of the clip 30. In addition to the actual compression due to lateral force Fb on the fabric F between the edge 58 of the central spring member 36 and the interior wall 56 of the clip body 34 the rear surface 41 of the periphery structure 40 of the clip body 34 has been rounded to increase the area upon which the fabric F has contact with to enhance the frictional contact of the fabric F with the clip body 34.

FIG. 9 also schematically depicts the force distribution within the elements if the clip 30. Since all the force emanates from the deflection of the clip's central spring member 36 relative to the clip body 34, this force Fa perpendicular to the plane of the clip 30 is transferred into two components, one component being perpendicular to the plane of the fabric Fb and a second component Fc being parallel to the plane of the fabric F.

At the compression points Fb the material is compressed to prevent movement. The further the fabric F is pushed up the narrowing gap 54 between the central spring member 36 and periphery structure 40 the greater the compressive force on the fabric. Because these compressive forces are transferred over a relatively long length along the edge 58 of the central spring member and interior wall 56 of the periphery structure 40 of the clip body 34 there is minimal damage, if any, to the fabric F. Prior art metal clips capture fabric only with the thin sharp edges of the sheet metal from which it is constructed as opposed to a flat surface of the metal. This is a one fundamental distinction between traditional perpendicular compression clips and the clip of this invention.

Figure 3:
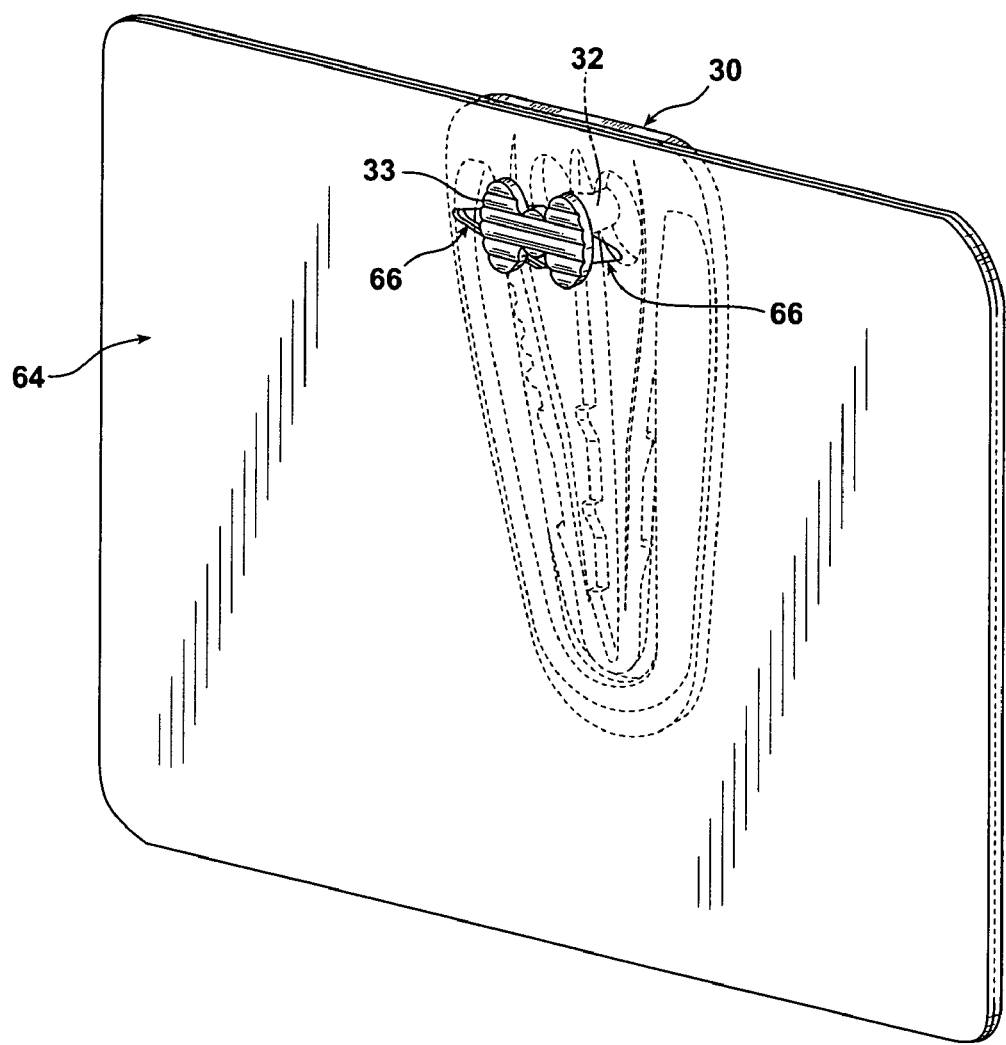
FIG. 3 is a front perspective view of the first embodiment of the clip of this invention with an identification badge attached thereto.
Figure 8:
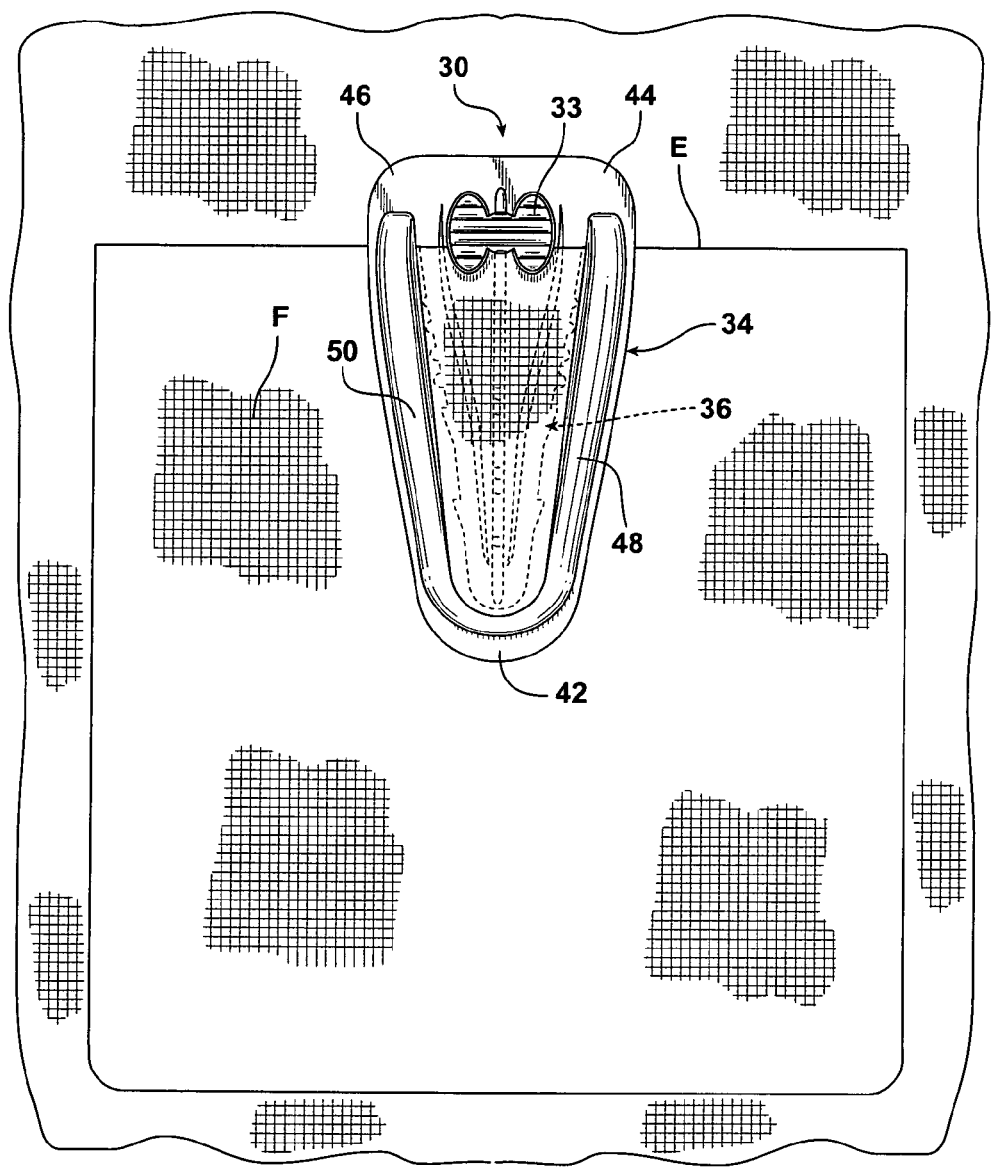
FIG. 8 is a front plan view of the first embodiment of the clip of this invention depicted in FIGS. 1 and 2, attached to a pocket of a garment.

Referring to FIGS. 1, 3 and 8, when the clip structure of this invention is used as a badge holder a badge 64, e.g., an identification badge, a name badge, an entrance pass, attaches to the badge post 32 by inserting the post 32 that is mounted on the clip body 34 through the slot 66 near the top of the badge 64. The badge is held onto the post 32 by means of the flat flange 33 on the end of the post 32. After the badge is attached to the post 32, the individual wearing the badge 64 can press the central spring member 36 near the apex 42 of the clip body 34 to separate the spring member 36 from the clip body 34 and attach the badge clip 30 to the wearer's garment, e.g., placing it over the pocket edge E to grab the pocket fabric F.

The badge 64 is mounted on the post 32 near the top of the clip 30 so that the user can easily hold the clip 30 in their fingers and can easily deflect the central spring member 36 from the clip body 34 with their finger in order to force the clip 30 over an edge of the garment, e.g., pocket, see FIGS. 1 and 8.

Referring to FIGS. 1, 3 and 8, the flat nature of the clip 30 as well as the orientation of the badge post 32 with the flat flange 33 on its end makes it intuitive for the user to recognize which part of the clip 30 attaches to the badge 64 and which part attaches to their garment fabric F. The post is of sufficient length to enable most common badges 64 (typically 10-20 mils thick) to freely swivel in order to maintain a horizontal orientation for easy viewing. Often, with prior badge clips, that badge is often askew and difficult to view and read.

Additionally, the flat flange 33 on the post 32 provides ample surface for the individual to optionally apply pressure to the central spring member 36 to provide sufficient space to place on a fabric F edge E. Since the badge 64 will always be attached to the clip 30, before the clip 30 is attached to the users clothing, it is intuitive as to which part of the clip 30 is on the inside and the outside of the clothing edge, e.g., see FIGS. 3 and 8.

Another benefit of the clip of this invention (all embodiments described) is that it is relatively thin flat clip, even when in use. The clip lies flat against the garment when in use and is not bulky and projecting from the garment as other known types of attachment devices. The flat clip design keeps the badge laying flat against to the wearer's clothing.

FIGS. 10-19 are different embodiments of the clip of this invention. In these drawings, elements similar to those in FIGS. 1-9 are numbered the same.

Figure 10:
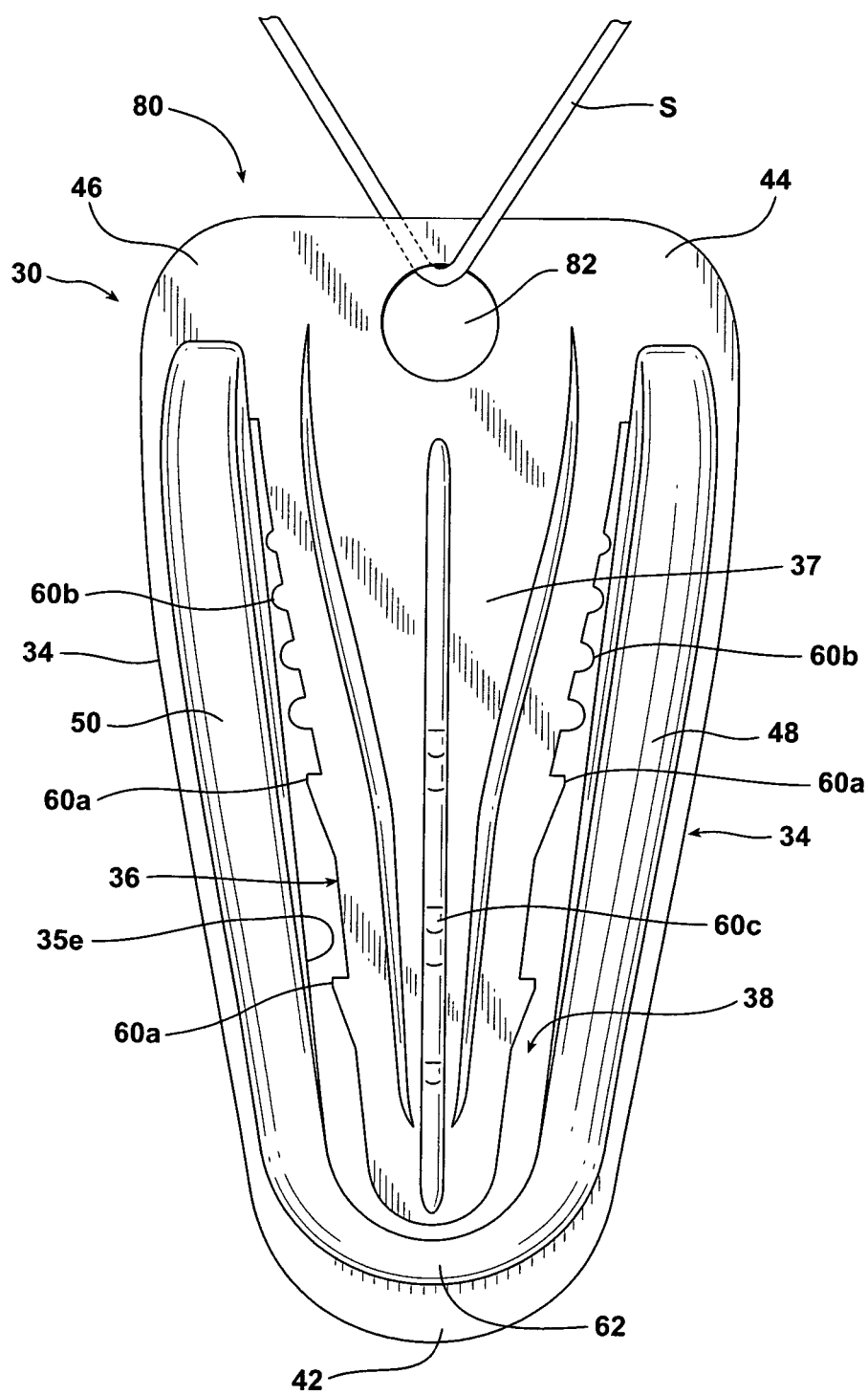
FIG. 10 is a front plan view of a second embodiment of the clip of this invention.

FIG. 10 is a front plan view of a second embodiment of the clip 80 of this invention. In this embodiment the badge post on the top 52 of the periphery structure 40 is not present and in its stead is a string or string or lanyard attachment hole 82 to permit the clip 80 to hang freely from, for example, from the neck of the user while the clip 80 grasps, for example, a speaker's ribbon, a napkin, etc.

Figure 11:
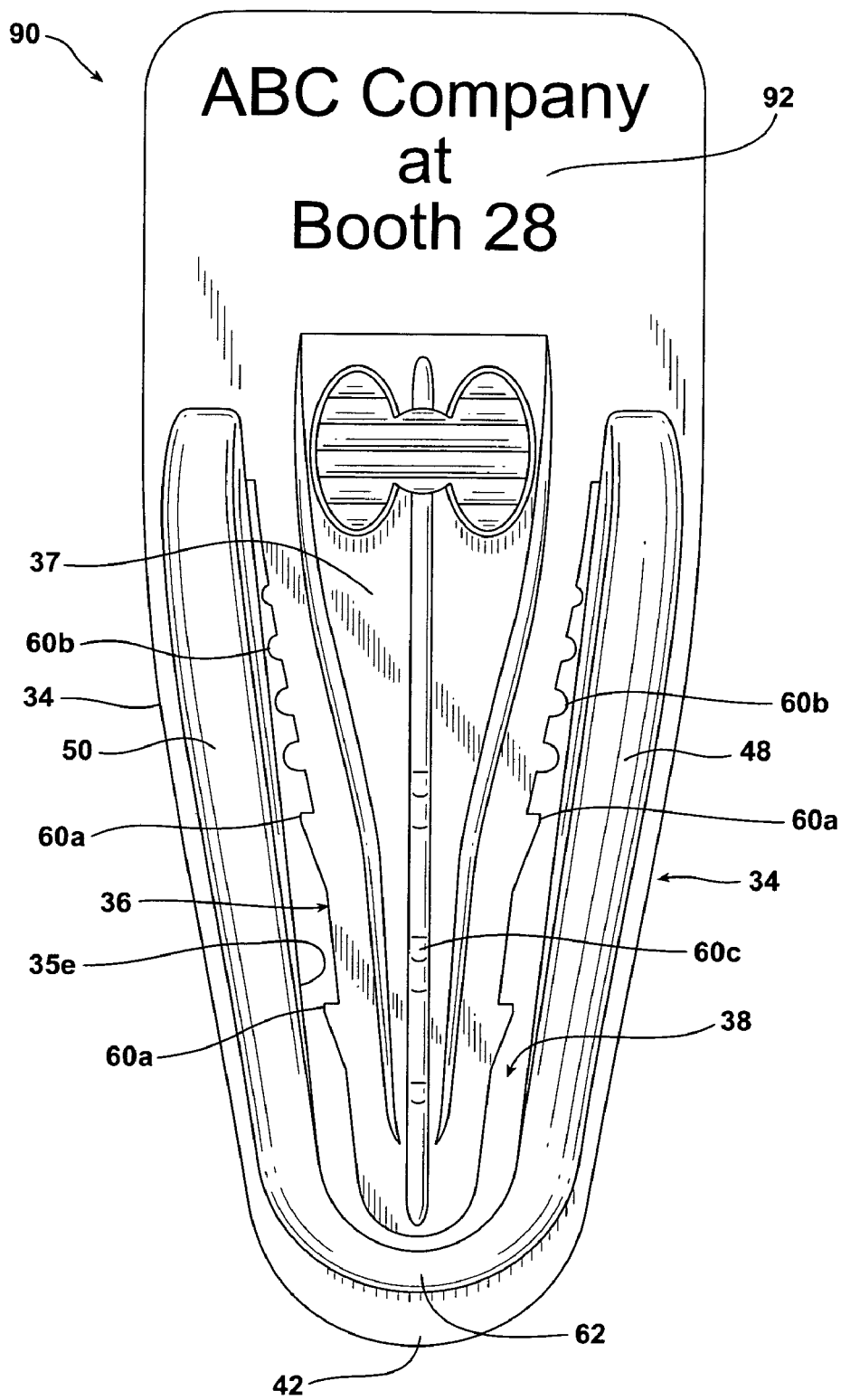
FIG. 11 is a front plan view of a third embodiment of the clip of this invention.

FIG. 11 is a front plan view of a third embodiment 90 of the clip of this invention. In this embodiment the top portion 52 of the periphery 40 has an extended planar surface 92. This permits the placement of a badge (not shown) on the badge post 32 and the placement of an indicia, e.g., a company name, an advertisement, etc. on the extended planar surface 92.

Figure 12:
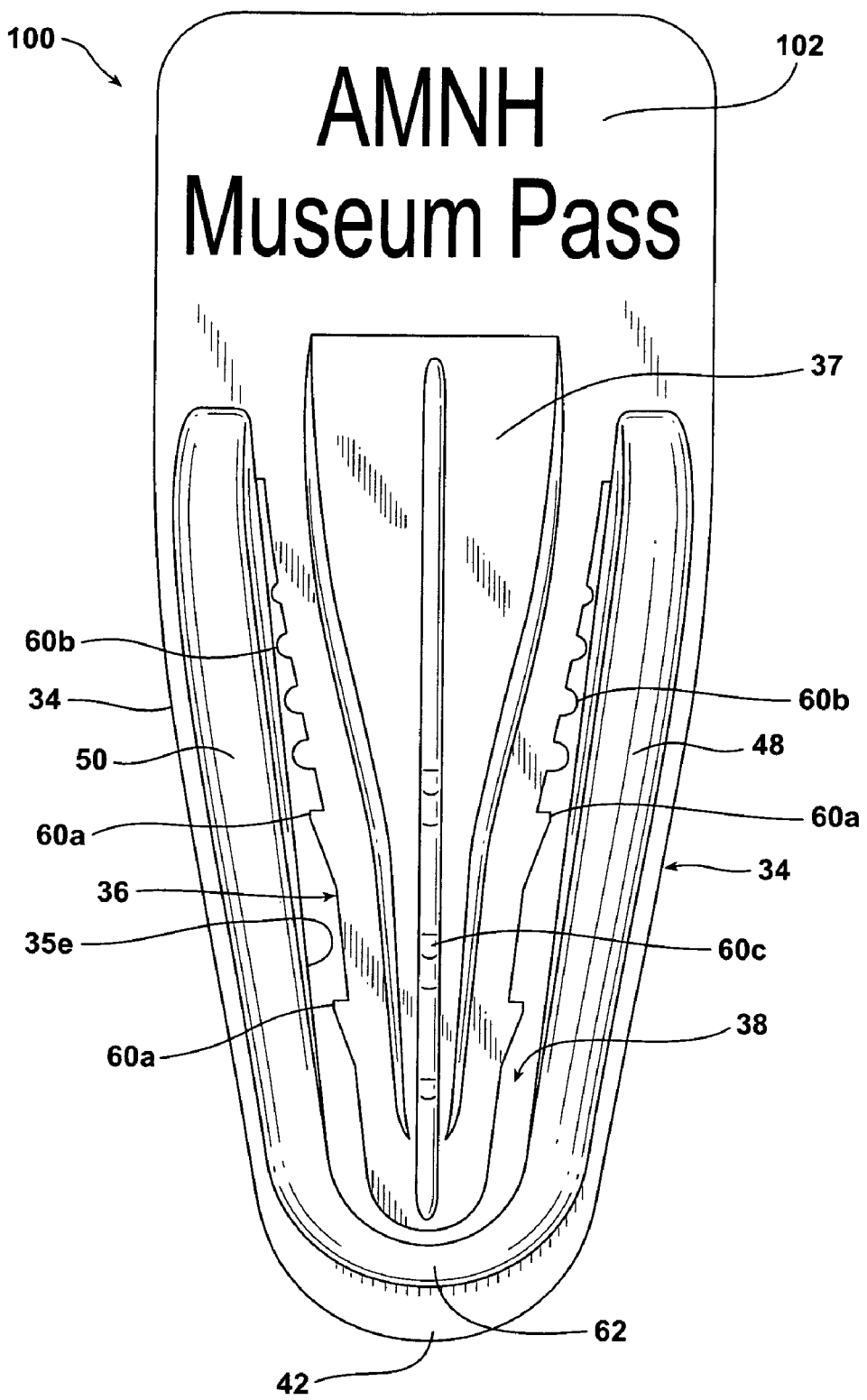
FIGS. 12-14 are front plan views of different variations of a fourth embodiment of the clip of this invention.
Figure 13:
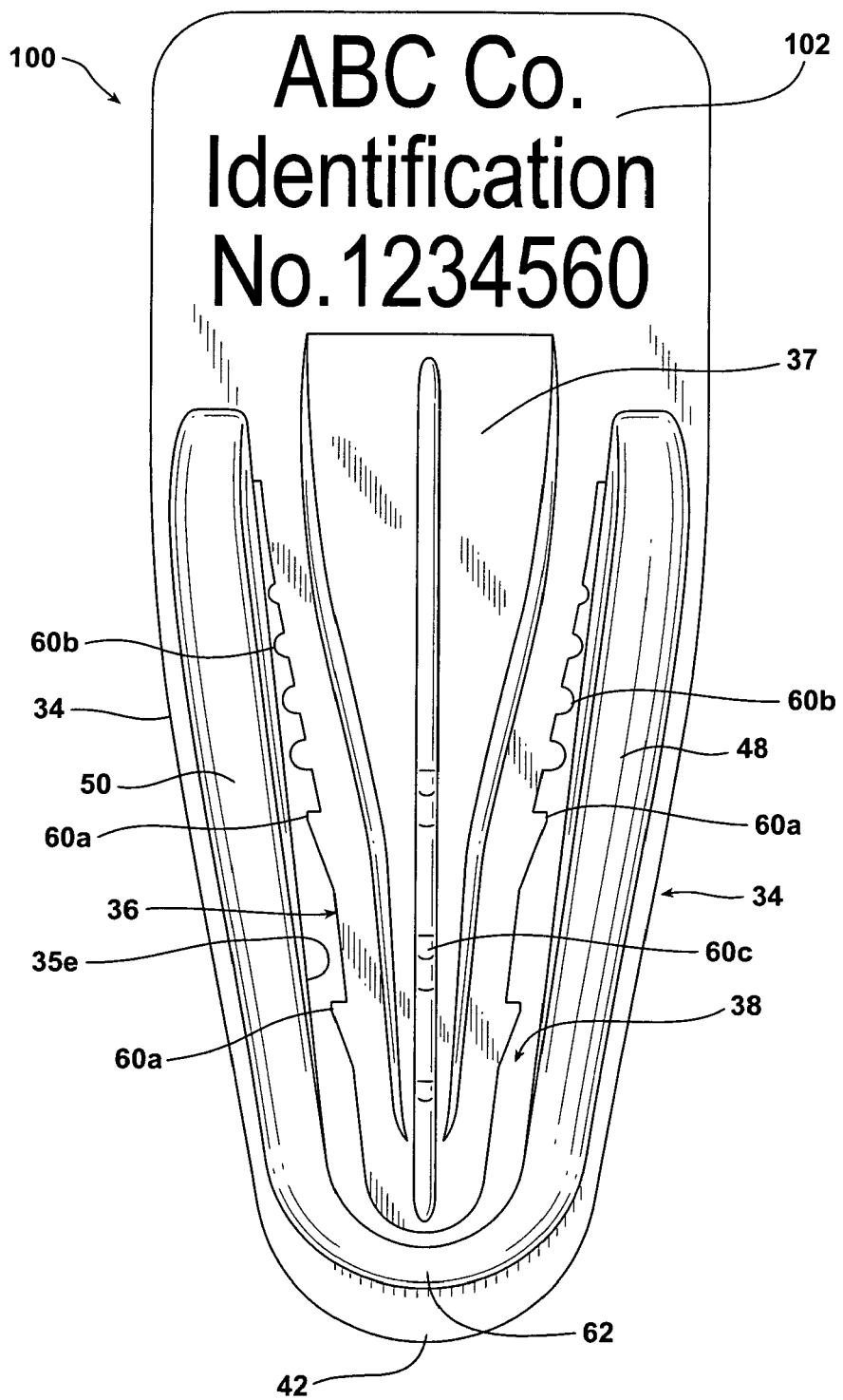
Figure 14:
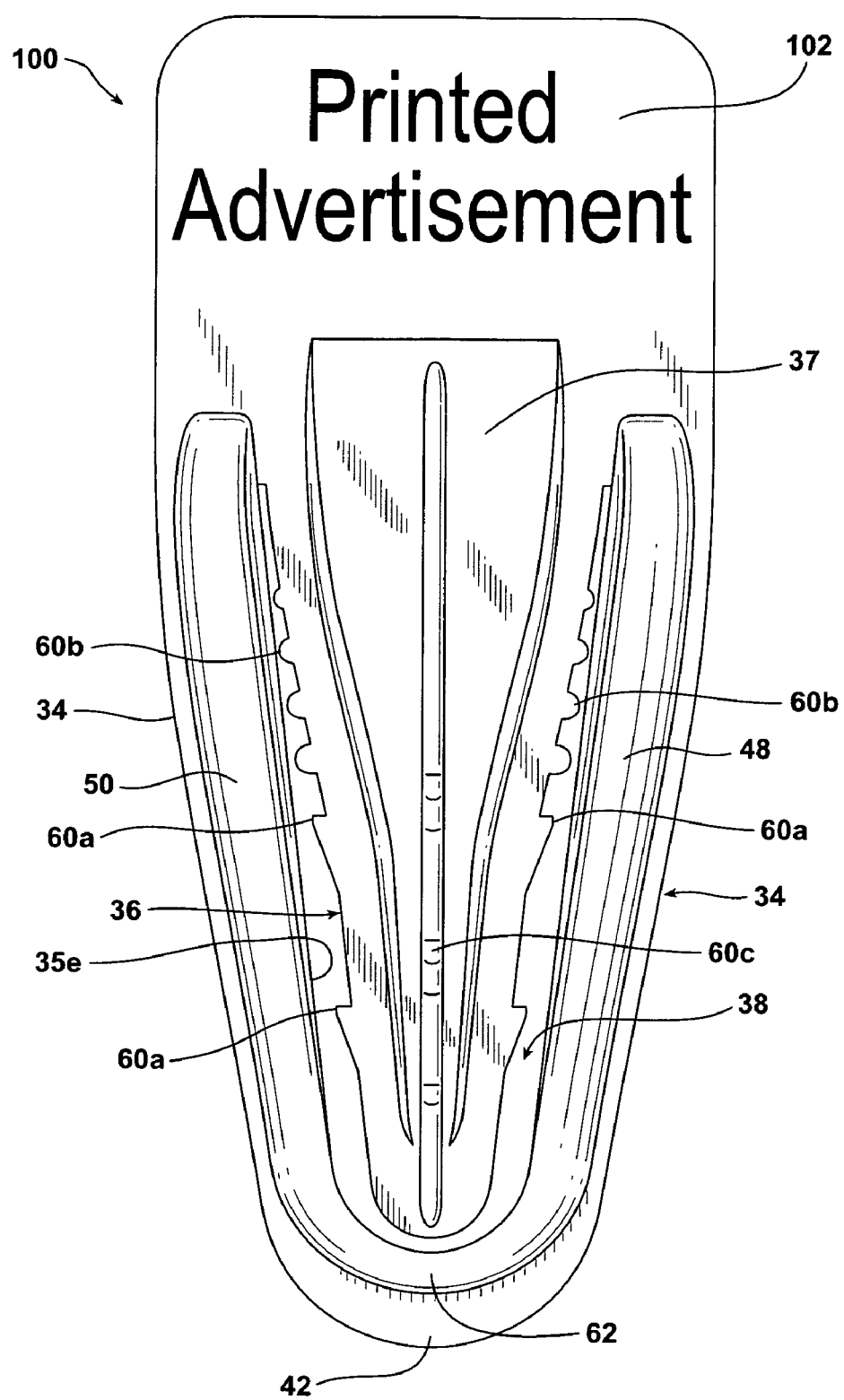

FIGS. 12, 13 and 14 are front plan views of different variations of a fourth embodiment 100 of the clip of this invention. In this embodiment the top portion of the periphery 40 has an extended planar surface 102. This embodiment eliminates the badge post and an indicia, e.g., a company name, pass for entrance to a facility (FIG. 12), personal identification (FIG. 13), an advertisement (FIG. 14), etc. is placed on the extended planar surface 102.

Figure 15:
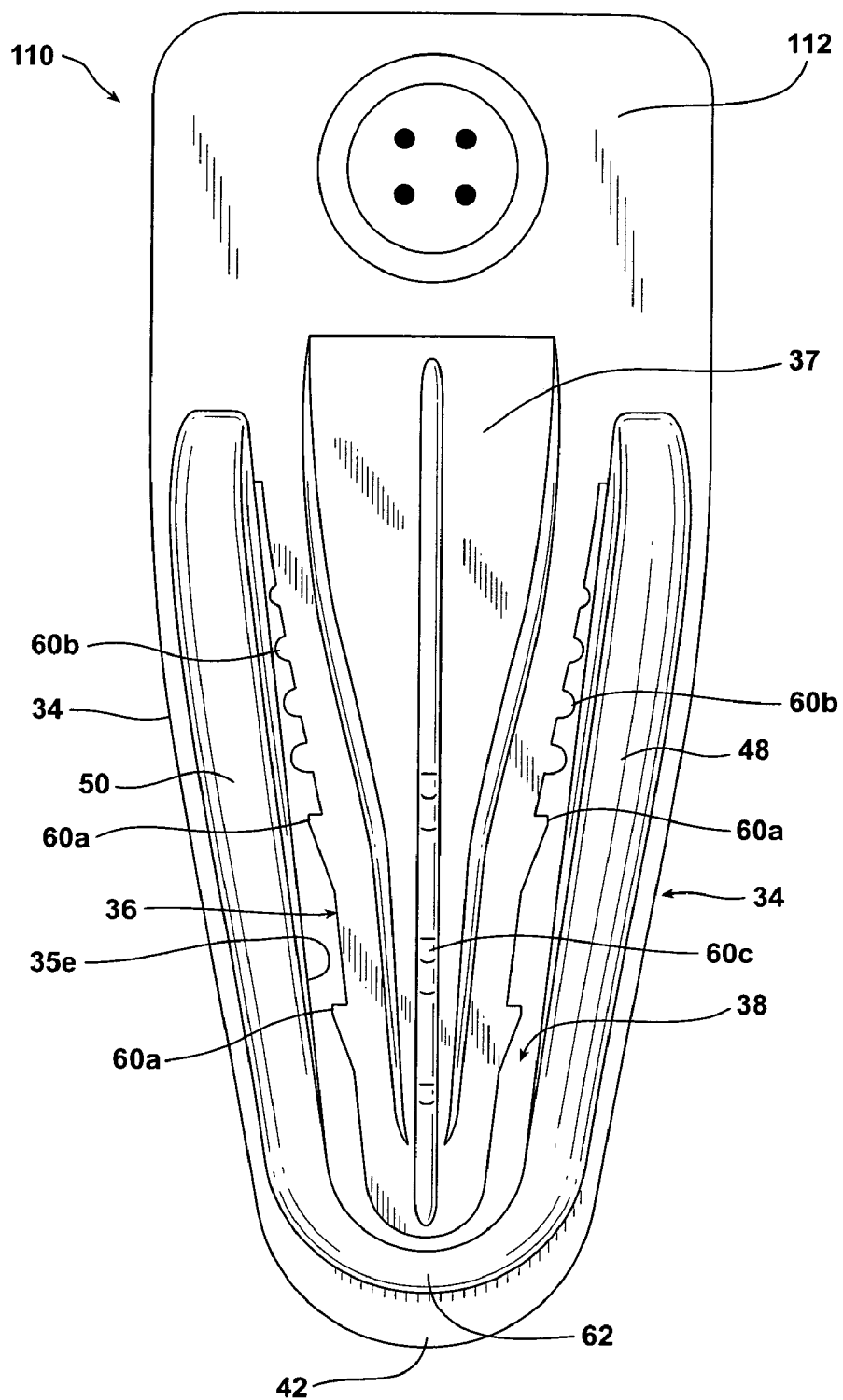
FIG. 15 is a front plan view of a fifth embodiment of the clip of this invention.

FIG. 15 is a front plan view of a fifth embodiment 110 of the clip of this invention. In this embodiment the top portion 52 of the periphery 40 has an extended planar surface 112. This embodiment also eliminates the badge post. The extended planar surface has mounted thereon a button 114. One use for this embodiment is as a napkin holder wherein the button 112 is attached to a button hole in the user's shirt and a napkin attached to the clip. The same functionality may be had by clipping the garment and napkin together.

Figure 16:
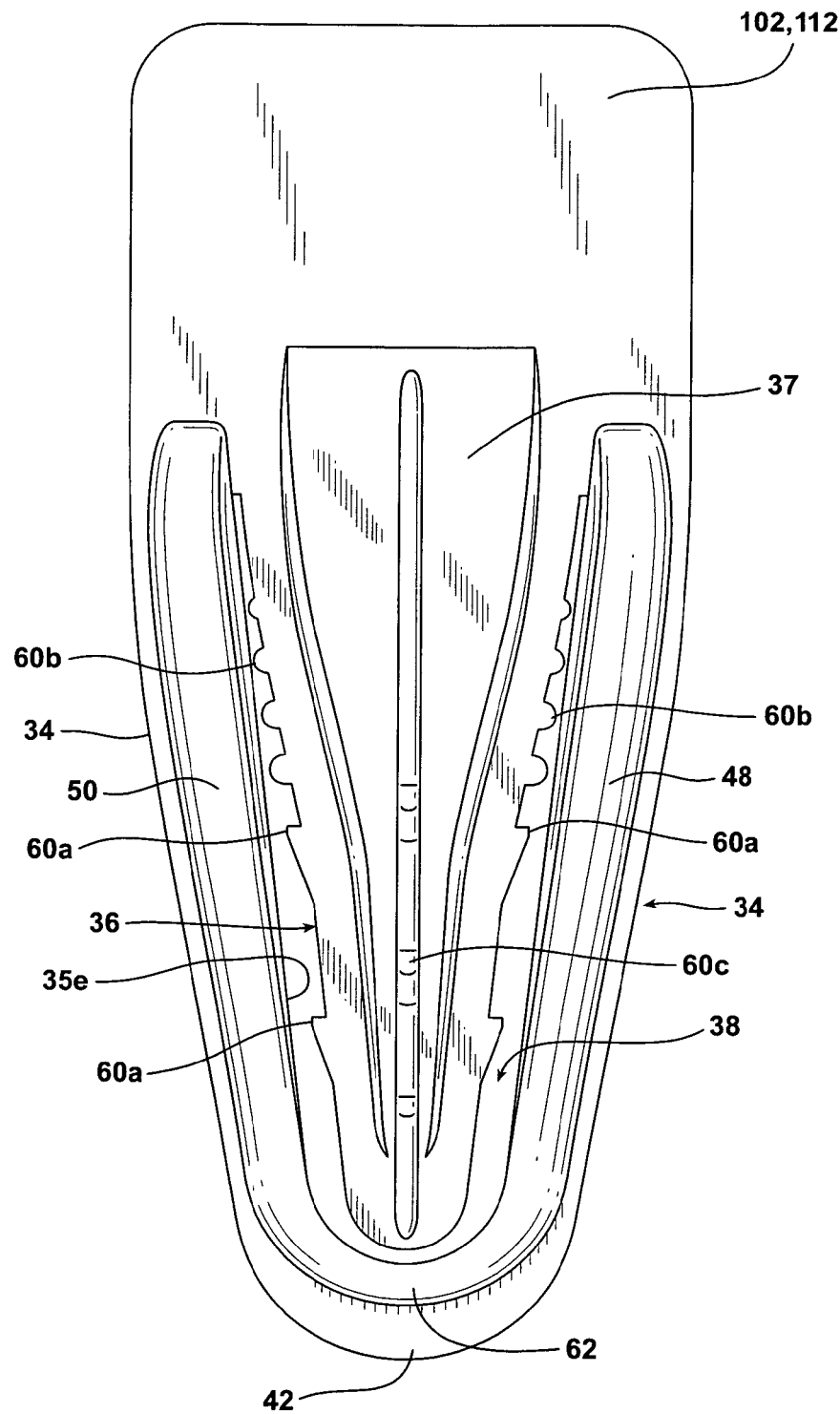
FIG. 16 is a rear plan view of the embodiments depicted in FIGS. 11-15 of the clip of this invention.

FIG. 16 is a rear plan view of the embodiments depicted in FIGS. 11-15 of the clip of this invention.

Figure 17:
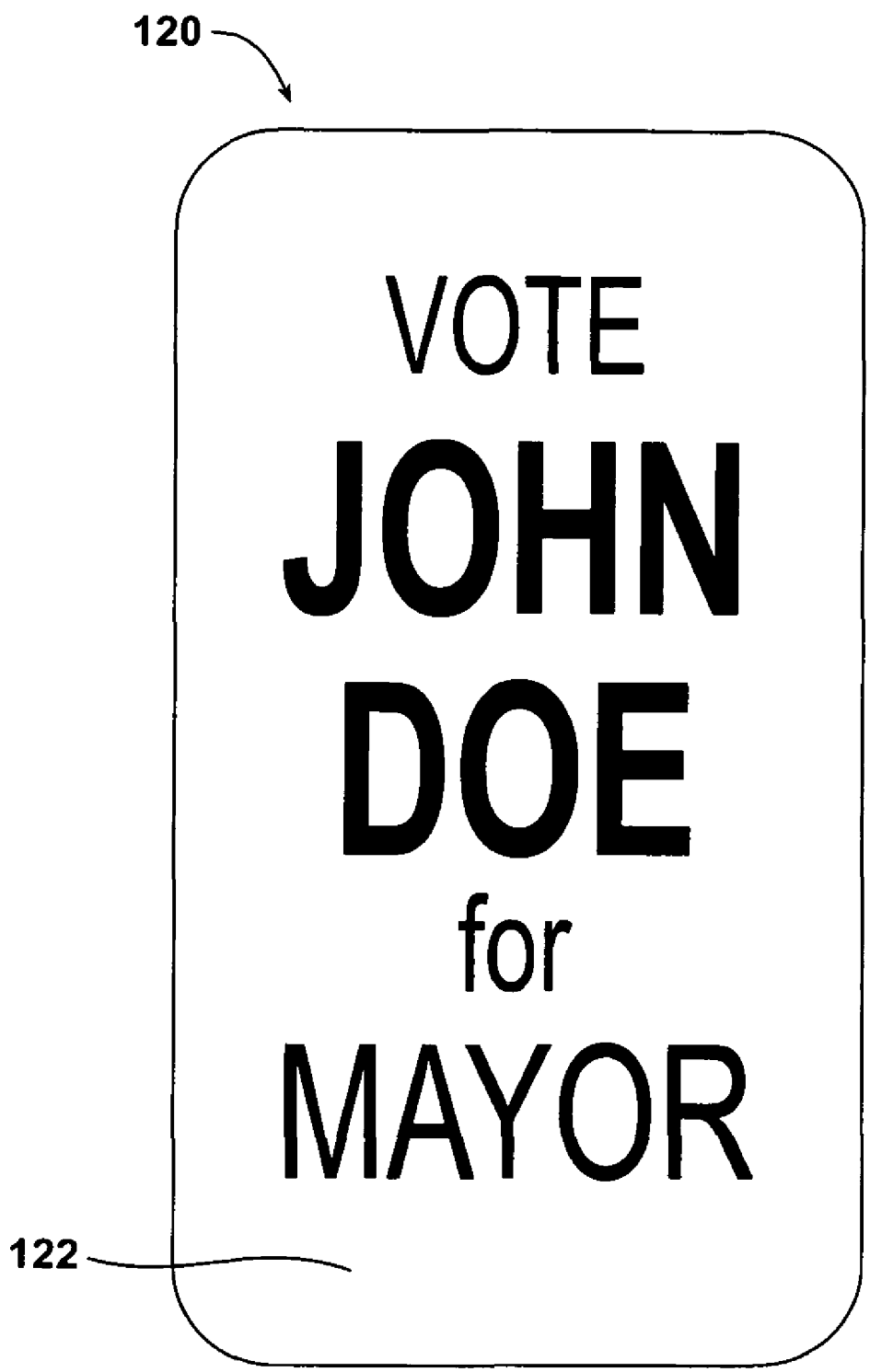
FIG. 17 is a front plan view of the sixth embodiment of the clip of this invention.
Figure 18:
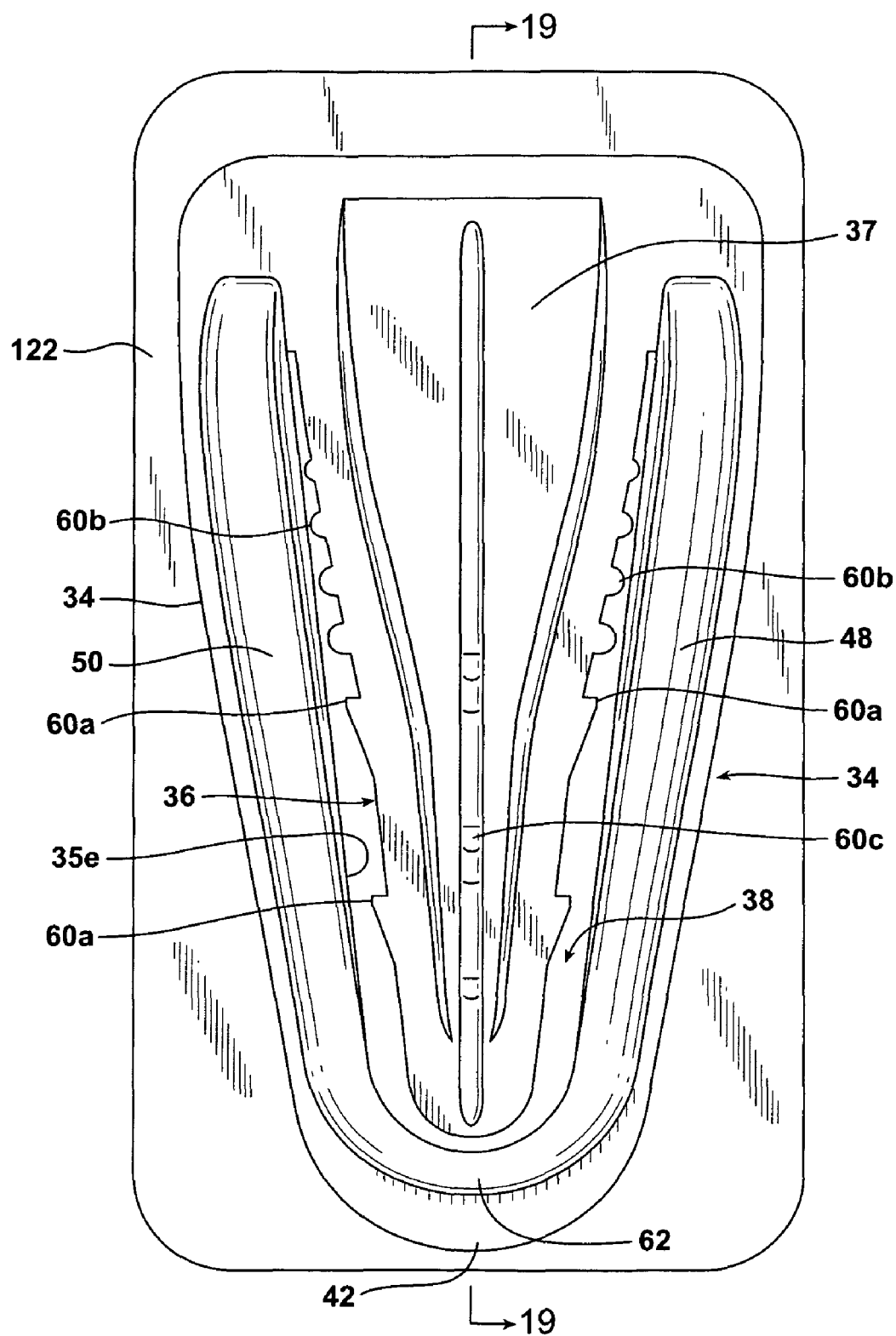
FIG. 18 is a rear plan view of the sixth embodiment of the clip of this invention.
Figure 19:
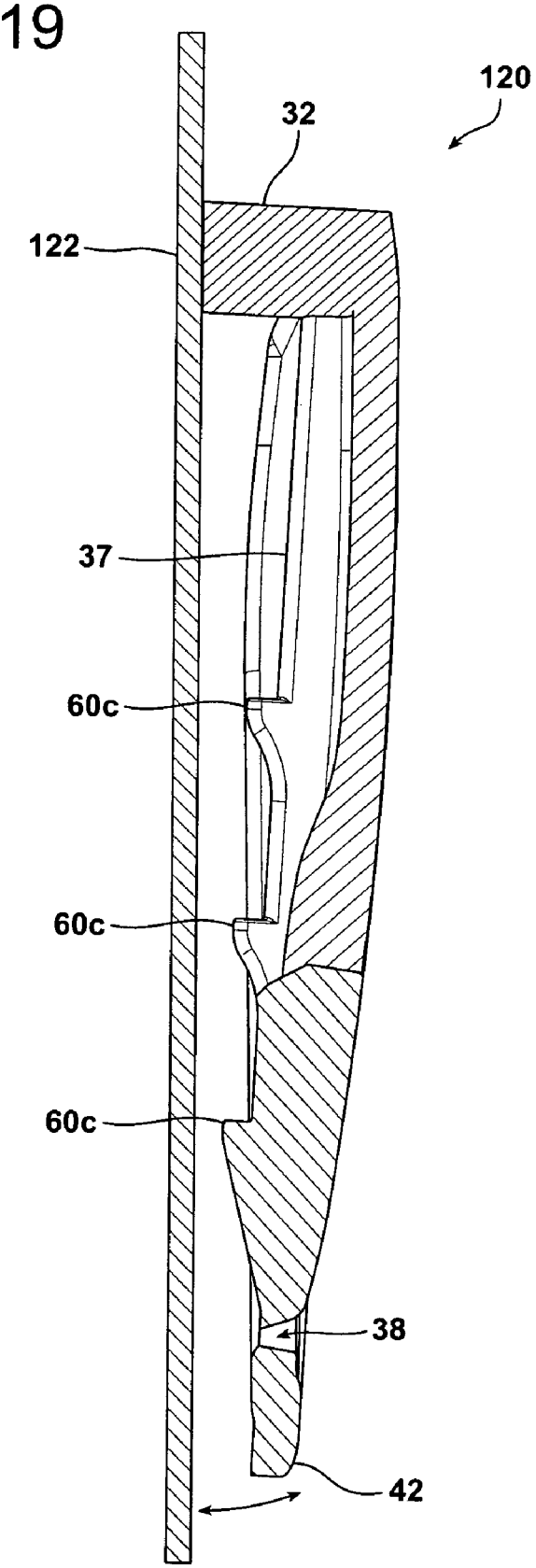
FIG. 19 is a cross-sectional view of the sixth embodiment of the clip of this invention taken along 19-19 of FIG. 18.

FIGS. 17-19 are views of the sixth embodiment 120 of the clip of this invention. FIG. 17 is a front plan view, FIG. 18 is a rear plan view, and FIG. 19 is a side view of this embodiment of the clip. In this embodiment a card 122, e.g., advertisement, identification, etc. extends from and is integral with the front portion of the clip body 34. To attach the clip 120 pressure is applied to the card 122.

While various changes may be made in the detailed construction and processes of this invention, it will be understood that such changes will be within the spirit and scope of the present invention. Having thus described the invention in detail, it is to be understood that the foregoing description is not intended to limit the spirit and scope thereof. What is desired to be protected by Letters Patent is set forth in the appended claims.

What is claimed is:

1. A unitary one piece clip for fabrics comprising:
  a substantially planar clip body having a front and rear surface and side edges;
  an opening in the clip body passing through the front and rear surfaces to form a periphery structure in the clip body, the periphery structure having an interior wall surrounding the opening;
  a substantially planar flexible central spring member having front and rear surfaces and a surrounding edge surface, the spring member appending from a top portion of the periphery structure and having an opposing free end terminating within the opening near a bottom portion of the peripheral structure, the spring member and periphery structure juxtaposed substantially within the same plane;
  a gap between the surrounding edge surface of the spring member and the interior wall of the periphery structure that decreases in width from the bottom portion of the peripheral structure to the top portion of the peripheral structure;
  a plurality of projecting elements projecting from the surrounding edge surfaces of the spring member;
  whereby the spring member is flexed out of the plane of the clip body creating a spring force, and when a fabric is placed over the surface of the spring member and pushed toward the top of the periphery structure, the spring force returns the spring member toward the plane of the clip body to grasp the fabric in the gap with the plurality of projecting elements projecting from the surrounding edge surfaces of the spring member pinching the fabric to thereby firmly hold the fabric in the clip.

2. The clip of claim 1, further comprising a planar area extending from the upper portion of periphery structure and an indicia area on the front surface of the periphery structure.

3. The clip of claim 1, wherein a string hole passes through the top portion of the periphery structure.

4. A unitary one piece badge holder for attachment to a garment fabric, comprising:
  a substantially planar clip body having a front and rear surface and side edges;
  an opening in the clip body passing through the front and rear surfaces to form a periphery structure in the clip body, the periphery structure having an interior wall surrounding the opening;
  a substantially planar flexible central spring member having front and rear surfaces and a surrounding edge surface, the spring member appending from a top portion of the periphery structure and having an opposing free end terminating within the opening near a bottom portion of the peripheral structure, the spring member and periphery structure juxtaposed substantially within the same plane;
  a gap between the surrounding edge surface of the spring member and the interior wall of the periphery structure that decreases in width from the bottom portion of the peripheral structure to the top portion of the peripheral structure;
  a plurality of projecting elements projecting from the surrounding edge surfaces of the spring member;
  a badge mounting member projecting from the front surface of the top portion of the periphery structure upon which a badge may be removably mounted;
  whereby the badge is mounted to the mounting member, the spring member is flexed toward the rear surface of the clip body out of the plane of the clip body creating a spring force, and the garment fabric is placed over the front surface of the spring member and pushed toward the top of the periphery structure, the spring force returns the spring member toward the plane of the clip body to grasp the fabric in the gap with the plurality of projecting elements projecting from the surrounding edge surfaces of the spring member pinching the fabric to thereby firmly hold the fabric in the clip to securely display the badge on the garment.

5. The badge of claim 4, further comprising a planar area extending from the upper portion of periphery structure and an indicia area on the front surface of the periphery structure.

6. A unitary one piece badge for attachment to a garment fabric, comprising:
   a substantially planar clip body having a front and rear surface and side edges;
   an opening in the clip body passing through the front and rear surfaces to form a periphery structure in the clip body, the periphery structure having an interior wall surrounding the opening;
   a substantially planar flexible central spring member having front and rear surfaces and a surrounding edge surface, the spring member appending from a top portion of the periphery structure and having an opposing free end terminating within the opening near a bottom portion of the peripheral structure, the spring member and periphery structure juxtaposed substantially within the same plane;
   a gap between the surrounding edge surface of the spring member and the interior wall of the periphery structure that decreases in width from the bottom portion of the peripheral structure to the top portion of the peripheral structure;
   a badge mounted to the front surface of the periphery structure;
   whereby the spring member is flexed out of the plane of the clip body creating a spring force, and the garment fabric is placed over the surface of the spring member and pushed toward the top of the periphery structure, the spring force returns the spring member toward the plane of the clip body to grasp the fabric and the gap pinches the fabric to thereby firmly hold the fabric in the clip to securely display the badge on the garment.

7. The badge of claim 6, further comprising a plurality of projecting elements projecting from the surrounding edge surfaces of the spring member to assist in firmly holding the fabric in the clip.

8. The badge of claim 6, further comprising a plurality of projecting elements projecting from the front surface of the central spring member to assist in firmly holding the fabric in the clip.

9. The badge of claim 6, further comprising a plurality of projecting elements projecting from the surrounding edge surfaces of the spring member and from the front surface of the central spring member to assist in firmly holding the fabric in the clip.

10. A unitary one piece clip for fabrics comprising:
    a substantially planar clip body having a front and rear surface and side edges;
    an opening in the clip body passing through the front and rear surfaces to form a periphery structure in the clip body, the periphery structure having an interior wall surrounding the opening;
    a substantially planar flexible central spring member having front and rear surfaces and a surrounding edge surface, the spring member appending from a top portion of the periphery structure and having an opposing free end terminating within the opening near a bottom portion of the peripheral structure, the spring member and periphery structure juxtaposed substantially within the same plane;
    a gap between the surrounding edge surface of the spring member and the interior wall of the periphery structure that decreases in width from the bottom portion of the peripheral structure to the top portion of the peripheral structure;
    a plurality of projecting elements projecting from the front surface of the central spring member;
    whereby the spring member is flexed out of the plane of the clip body creating a spring force, and when a fabric is placed over the surface of the spring member and pushed toward the top of the periphery structure, the spring force returns the spring member toward the plane of the clip body to grasp the fabric in the gap with the plurality of projecting elements projecting from the central spring member pinching the fabric to thereby firmly hold the fabric in the clip.

11. A unitary one piece clip for fabrics comprising:
    a substantially planar clip body having a front and rear surface and side edges;
    an opening in the clip body passing through the front and rear surfaces to form a periphery structure in the clip body, the periphery structure having an interior wall surrounding the opening;
    a substantially planar flexible central spring member having front and rear surfaces and a surrounding edge surface, the spring member appending from a top portion of the periphery structure and having an opposing free end terminating within the opening near a bottom portion of the peripheral structure, the spring member and periphery structure juxtaposed substantially within the same plane;
    a gap between the surrounding edge surface of the spring member and the interior wall of the periphery structure that decreases in width from the bottom portion of the peripheral structure to the top portion of the peripheral structure;
    a plurality of projecting elements projecting from the surrounding edge surfaces of the spring member and from the front surface of the central spring member;
    whereby the spring member is flexed out of the plane of the clip body creating a spring force, and when a fabric is placed over the surface of the spring member and pushed toward the top of the periphery structure, the spring force returns the spring member toward the plane of the clip body to grasp the fabric in the gap with the plurality of projecting elements projecting from the surrounding edge surfaces of the spring member and from the front surface of the central spring member pinching the fabric to thereby firmly hold the fabric in the clip.

12. A unitary one piece badge holder for attachment to a garment fabric, comprising:
    a substantially planar clip body having a front and rear surface and side edges;
    an opening in the clip body passing through the front and rear surfaces to form a periphery structure in the clip body, the periphery structure having an interior wall surrounding the opening;
    a substantially planar flexible central spring member having front and rear surfaces and a surrounding edge surface, the spring member appending from a top portion of the periphery structure and having an opposing free end terminating within the opening near a bottom portion of the peripheral structure, the spring member and periphery structure juxtaposed substantially within the same plane;
    a gap between the surrounding edge surface of the spring member and the interior wall of the periphery structure that decreases in width from the bottom portion of the peripheral structure to the top portion of the peripheral structure;
    a plurality of projecting elements projecting from front surface of the central spring member;

a badge mounting member projecting from the front surface of the top portion of the periphery structure upon which a badge may be removably mounted;

whereby the badge is mounted to the mounting member, the spring member is flexed toward the rear surface of the clip body out of the plane of the clip body creating a spring force, and the garment fabric is placed over the front surface of the spring member and pushed toward the top of the periphery structure, the spring force returns the spring member toward the plane of the clip body to grasp the fabric in the gap with the plurality of projecting elements projecting from the central spring member pinching the fabric to thereby firmly hold the fabric in the clip to securely display the badge on the garment.

13. A unitary one piece badge holder for attachment to a garment fabric, comprising:

a substantially planar clip body having a front and rear surface and side edges;

an opening in the clip body passing through the front and rear surfaces to form a periphery structure in the clip body, the periphery structure having an interior wall surrounding the opening;

a substantially planar flexible central spring member having front and rear surfaces and a surrounding edge surface, the spring member appending from a top portion of the periphery structure and having an opposing free end terminating within the opening near a bottom portion of the peripheral structure, the spring member and periphery structure juxtaposed substantially within the same plane;

a gap between the surrounding edge surface of the spring member and the interior wall of the periphery structure that decreases in width from the bottom portion of the peripheral structure to the top portion of the peripheral structure;

a plurality of projecting elements projecting from the surrounding edge surfaces of the spring member and from the front surface of the central spring member;

a badge mounting member projecting from the front surface of the top portion of the periphery structure upon which a badge may be removably mounted;

whereby the badge is mounted to the mounting member, the spring member is flexed toward the rear surface of the clip body out of the plane of the clip body creating a spring force, and the garment fabric is placed over the front surface of the spring member and pushed toward the top of the periphery structure, the spring force returns the spring member toward the plane of the clip body to grasp the fabric and the gap a plurality of projecting elements projecting from the surrounding edge surfaces of the spring member and from the front surface of the central spring member pinches the fabric to thereby firmly hold the fabric in the clip to securely display the badge on the garment.

* * * * *